Patented May 15, 1923.

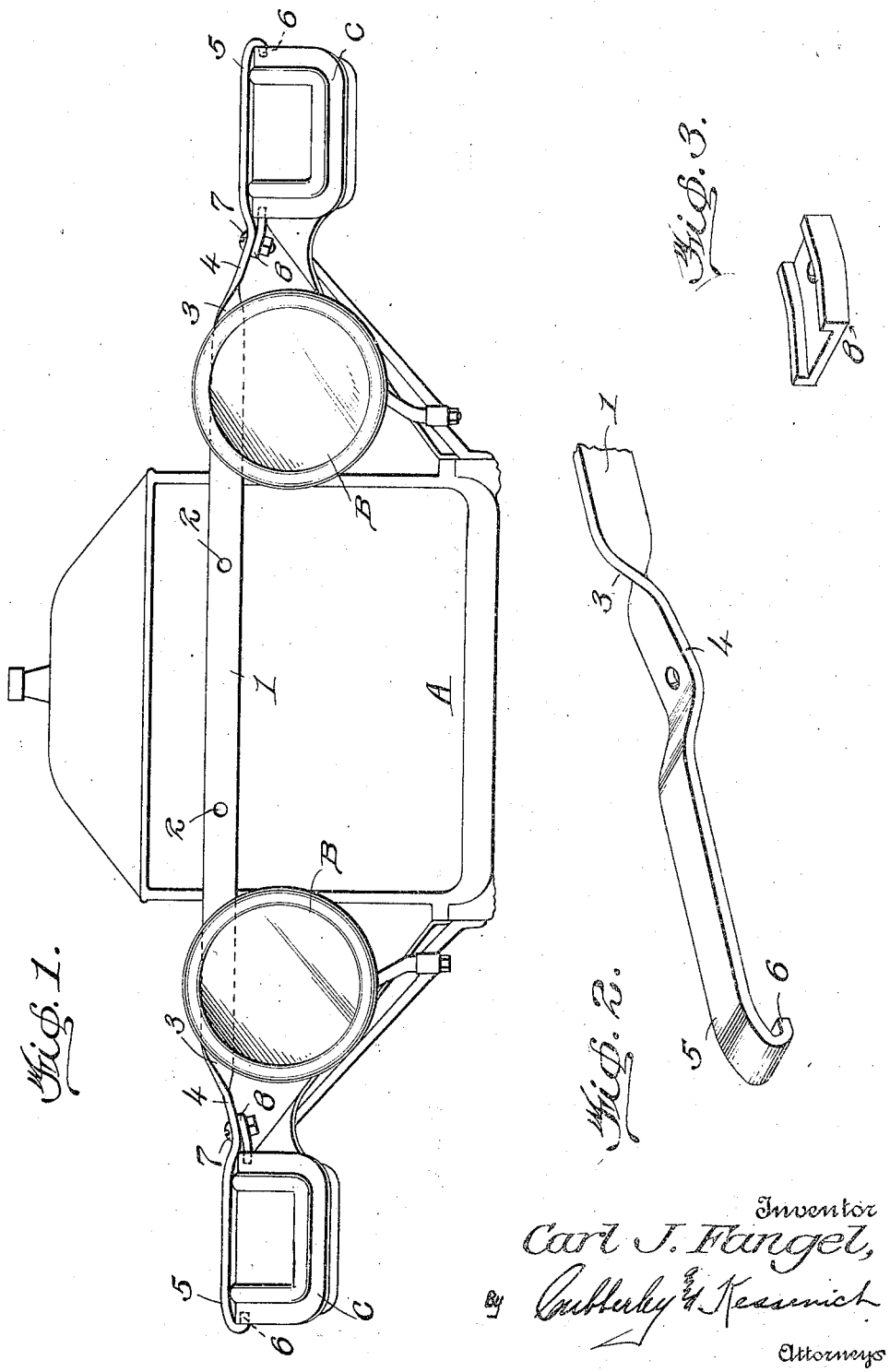

1,455,327

UNITED STATES PATENT OFFICE.

CARL J. FANGEL, OF McALESTER, OKLAHOMA.

FENDER BRACE.

Application filed May 6, 1922. Serial No. 558,908.

*To all whom it may concern:*

Be it known that I, CARL J. FANGEL, a citizen of the United States, residing at McAlester, in the county of Pittsburg and State of Oklahoma, have invented certain new and useful Improvements in Fender Braces, of which the following is a specification.

My invention has reference, in general terms, to improvements in detachable devices for bracing and reinforcing automobile fenders or mud guards, and more particularly, the body of my device is so constructed that it is adapted to serve as a support for license plates and the like.

In order to more clearly define the functions and advantages of my invention, it is pointed out that fender braces now known in the art are not adapted for ready attachability, and furthermore, most braces are fixed directly upon the automobile as a part of its initial equipment. My device as distinguished from others of a similar classification, is not attached to the body of a car but is supported by the fenders which it reinforces and braces, and it may be mounted upon the fenders and detached therefrom with ease and without the use of special tools.

Briefly stated the principal objects of my invention are; first, to provide a fender brace which is supported entirely by the fenders which it reinforces; second, to provide a brace which may be readily applied or detached without the use of special tools or instruments; third, to provide means whereby a license plate and the like may be mounted upon the body of the brace; and, fourth, to attain the above and other ends by a one-piece brace, held in position by two simple and effective clips.

To these and other ends, my invention consists in the construction, arrangement and combination of elements described hereinafter and pointed out in the claims forming a part of this specification.

One embodiment of my invention is represented by way of example in the accompanying drawings, wherein:

Figure 1, is a partial front elevation of an automobile illustrating the manner in which my invention is applied.

Figure 2, is a fragmentary perspective showing one end of the device.

Figure 3, is a perspective of a modified form of the clip.

In the drawings wherein like characters of reference designate like or similar parts:—

(A) designates the body of a conventional automobile, (B) the lamps and (C) a pair of front fenders or mud guards. These are shown for the sake of illustration and form no part of my invention.

My fender brace is formed of one piece of metal and comprises an elongated body (1) provided with openings (2) for the reception of attaching bolts of the usual license plate or the like, (not shown). The brace is adapted to be disposed transversely across the front of an automobile above the lamps (B), or across the rear, depending upon whether the front or rear fenders are to be reinforced. Adjacent each of the ends of the body (1) the metal is twisted as at (3) bent from the plane of the body (1) as at (4) and then upwardly and outwardly to form curved, hooked terminals (5) which bridge over and rest upon both side edges and the tops of the fenders (C) as illustrated. The hooked ends (6) extend beneath the outer edges of the fenders as shown, and the bends (4) dispose the body (1) above the lamps (B). Attached to the brace through the medium of bolts (7) extending through openings in the bent portions (4) thereof, are normally curved, spring metal plates (8) which are adjusted, when the brace is applied, to clamp the inner edges of the fenders to securely hold the brace in position thereon. It will be seen from the foregoing that to apply the brace, the hooked portions are disposed beneath the outer edges of the fenders and the clips adjusted to firmly retain the assembly in position.

In the modification shown in Figure 3, the metal plates (8) are formed with opposed flanges which are adapted to embrace the portions (4) of the brace to prevent lateral displacement.

If the mud guards or fenders of an automobile are loose the brace is applied, and vibration, independent of that of the entire car, is eliminated. Furthermore, distortion of the fenders is prevented, and any or all of the fenders so braced may be subjected to unusal stress or strain without showing any detrimental effects. The brace may be applied to practically any type of automobile and because of its simplicity and effectiveness, and its adaptability for the retention of license plates, it forms a novel and extremely useful accessory which may be manufactured and sold at a comparatively small price. By twisting the brace as at (3) the intermediate portion (1) is enabled to be positioned between the lamps and the radiator or between the rear of the body and the spare tire.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claim.

Having described my invention and its objects with such attention to detail as will acquaint one skilled in the art with its construction and advantages, I claim:

A fender brace comprising an elongated bar including an intermediate body portion and curved fender engaging terminals, the extremities of the intermediate body portion being inclined to dispose the terminals on a plane below the plane of the intermediate body portion, the inclined portion being twisted to lie in a plane at right angles to the intermediate body portion, and normally curved, spring metal plates pivotally mounted on the inclined portion and engageable beneath the inner edges of the fenders, said plates being channeled to embrace the inclined portion.

In testimony whereof I affix my signature hereto.

CARL J. FANGEL.